US008638927B2

(12) United States Patent
Takenaka et al.

(10) Patent No.: US 8,638,927 B2
(45) Date of Patent: Jan. 28, 2014

(54) CRYPTOGRAPHIC PROCESSING METHOD, COMPUTER READABLE STORAGE MEDIUM, AND CRYPTOGRAPHIC PROCESSING DEVICE

(75) Inventors: Masahiko Takenaka, Kawasaki (JP); Kouichi Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 523 days.

(21) Appl. No.: 12/886,051

(22) Filed: Sep. 20, 2010

(65) Prior Publication Data

US 2011/0007894 A1 Jan. 13, 2011

Related U.S. Application Data

(63) Continuation of application No. PCT/JP2008/000814, filed on Mar. 28, 2008.

(51) Int. Cl.
*H04K 1/00* (2006.01)

(52) U.S. Cl.
USPC .......................................................... 380/28

(58) Field of Classification Search
USPC ............................................................ 380/28
See application file for complete search history.

(56) References Cited

U.S. PATENT DOCUMENTS

| 7,065,788 | B2 * | 6/2006 | Yajima et al. ................... 726/23 |
| 7,536,011 | B2 * | 5/2009 | Takenaka et al. ............... 380/28 |
| 2004/0093369 | A1 | 5/2004 | Yamada |
| 2007/0177721 | A1 * | 8/2007 | Itoh et al. ........................ 380/28 |
| 2008/0025500 | A1 * | 1/2008 | Izu et al. ......................... 380/28 |
| 2009/0067617 | A1 * | 3/2009 | Trichina et al. ................. 380/28 |
| 2009/0097637 | A1 * | 4/2009 | Boscher et al. ................. 380/28 |

FOREIGN PATENT DOCUMENTS

| JP | 2003-233307 | 8/2003 |
| JP | 2004-164086 | 6/2004 |
| JP | 2007-187908 | 7/2007 |

OTHER PUBLICATIONS

Japanese Office Action issued Sep. 25, 2012 in corresponding Japanese Patent Application No. 2010-0505038.
Kouichi Itoh et al., "Improving the Randomized Initial Point Countermeasure Against DPA", 4th International Conference, Applied Cryptography and Network Security, Jun. 2006, pp. 459-469.
International Search Report issued Jun. 17, 2008 in corresponding International Application PCT/JP2008/000814.

(Continued)

*Primary Examiner* — Krista Zele
*Assistant Examiner* — James Forman
(74) *Attorney, Agent, or Firm* — Staas & Halsey LLP

(57) ABSTRACT

401 stores, in 302, key d' obtained by subtracting random number 2r held in 201 from key d held in 105. When an operation starts, the values "−C" and "−$C^2$" are calculated respectively, and the resultant values are stored in a multiplication table memory 205 together with value "C". In a first operation cycle, 107 selects and outputs an intermediate value 108 held in an in-operation data register 103, and thereby makes a modular-multiplication operation circuit 104 perform squaring. In the second operation cycle, 107 selects and outputs one of three values held in 205 in accordance with the combination of key bit value $d'_i$ and random number bit value $r_i$, and thereby makes the modular-multiplication operation circuit 104 perform multiplication. Thereby, a cryptographic processing device that requires a short operation time period, small circuit scale, and has sufficient security can be realized.

3 Claims, 5 Drawing Sheets

(56) References Cited

OTHER PUBLICATIONS

Paul Kocher, et al., "Differential Power Analysis," Proceedings of Advances in Cryptology—Crypto'99, Lecture Notes in Computer Science, vol. 1666, Springer-Verlag, 1999, pp. 388-397, 1999.

Thomas S. Messerges, et al., "Power Analysis Attacks of Modular Exponentiation in Smartcards," Cryptographic Hardware and Embedded Systems (CHES'99), Lecture Notes in Computer Science, vol. 1717, Springer-Verlag, pp. 144-157, 1999.

Jean-Sebastien, et al., "Resistance Against Differential Power Analysis fro Elliptic Curve Cryptosystems", Cryptographic Hardware and Embedded Systems (CHES '99), Lecture Notes in Computer Science, vol. 1717, Springer-Verlag, pp. 292-302, 1999.

C. Clavier, et al., "Universal Exponentiation Algorith: A First Step Towards Provable Spa-Resistance," Ches'01, LNCS 2162, Springer-Verlag, pp. 300-308, 2001.

M. Ciet, et al., "Virtually Free Randomization Techniques for Elliptic Curve Cryptograhy," Information and Communications Security (ICICS 2003), LNCS 2836, Springer-Verlag, pp. 348-359, 2003.

Taher El Gamal, A Public Key Cryptosystem and a Signature Scheme Based on Discrete Logarithms, IEEE Transactions on Information Theory 31 pp. 469-472, 1985.

* cited by examiner

CRYPTOGRAPHIC PROCESSING METHOD, COMPUTER READABLE STORAGE MEDIUM, AND CRYPTOGRAPHIC PROCESSING DEVICE

CROSS-REFERENCE TO RELATED APPLICATIONS

This application is a continuation of PCT application PCT/JP2008/000814 which was filed on Mar. 28, 2008, the entire contents of which are incorporated herein by reference.

FIELD

The embodiments discussed herein are related to the field of cryptography, and to a tamper proofing technique is for protecting a private key in a cryptographic processor from attacks referred to as side channel attacks.

BACKGROUND

Cryptography methods can roughly be categorized into two methods, common-key cryptography and public-key cryptography. According to common-key cryptography, the same key (private key) is used for encryption and decryption, and security is ensured by preventing the private key from being known to a third person, who is neither a transmitter nor receiver. According to public-key cryptography, different keys are used for encryption and decryption, respectively, and the key for encryption (public key) is made public, but the key for decrypting the encrypted text (private key) is secret, known only to the receiver, and thereby security is ensured.

Among techniques employed in the field of cryptography, there is a technique referred to as cryptanalysis. Cryptanalysis is a technique used for estimating secret information such as a private key or the like from accessible information such as the encrypted texts or the like, and has a wide variety of methods. Among them, there is a method referred to as a side channel attack method that has attracted attention recently. The side channel attack method was invented by Paul Kocher in 1998, and in it electrical power consumption data, noise, processing time period, and the like obtained when various data is input to the cryptographic processor mounted on a smart card or the like are collected and analyzed in order to estimate the key information in the cryptographic processor. It is known that the use of the side channel attack makes it possible to estimate the private keys in cryptographic processors regardless of whether the cryptography method is the common-key cryptography or the public-key cryptography.

The side channel attack includes a timing attack, by which processing time periods are measured and analyzed, a power analysis attack, by which power consumption is analyzed, and an electromagnetic-wave analysis attack, which uses noise, etc. Countermeasures are needed in particular against power analysis attacks and electromagnetic-wave analysis attacks because they are powerful attacking/analyzing methods. The power analysis attack and the electromagnetic-wave analysis attack are different from each other in measurement targets and measuring methods, but are the same in the essential analysis methods and countermeasures that can be used against them. Accordingly, this document describes the power analysis attack as a representative of all those attacking methods.

There are two types of power analysis attacks, a single power analysis attack (referred to as SPA hereinafter) and a differential power analysis attack (referred to as DPA hereinafter). SPA estimates the private key from characteristics of single power consumption data from the cryptographic processor, and DPA estimates the private key by analyzing the difference between many pieces of power consumption data.

Non Patent Document 1 (referred to as Kocher99 hereinafter) describes estimation methods using SPA and DPA and targeting common-key cryptographies such as DES, AES, and the like.

Non Patent Document 2 (referred to as Messerges99 hereinafter) and Non Patent Document 3 (referred to as Coron99 hereinafter) describe estimation methods using SPA and DPA targeting public-key cryptographies such as RSA cryptography, elliptic curve cryptography, and the like.

Today, among public-key cryptographies, RSA cryptography is used normally. Security provided by RSA cryptography is based on the difficulty of the prime factorization program, and this cryptography was proposed by R. Rivest, A. Shamir and L. Adleman in 1977.

The fundamental algorithms of RSA cryptography are as below.

$$C = M^e \bmod N \quad (1)$$

$$M = C^d \bmod N \quad (2)$$

In the above algorithms, M represents a clear text message, C represents an encrypted text, (e, N) represents a public key, (d, N) represents a private key, and mod N represents a remainder of N.

In RSA cryptography, large integers such as those equal to or greater than 1024 bits are used for M, C, e, d, N, etc. Thus, an RSA cryptography device has to be implemented by combining simple operations such as those performed by a multiplier or an adder. In particular, the processes of the raising portions (exponential portions) have to be repeated in accordance with the value of the exponent, and multipliers and adders have to be controlled. The Binary method is the most representative method for this process. In the Binary method, an exponent (such as n-bit private key d for example) is expressed in binary ($d = d_{n-1} d_{n-2} \ldots d_1 d_0$), and the raising operation for decryption is performed using the following expression.

$$C^d = ((\ldots ((C^{d_{n-1}})^2 * C^{d_{n-2}})^2 * \ldots)^2 * C^{d_1})^2 * C^{d_0} \quad (3)$$

In the above expression, remainder operations are performed in all the terms, and thus they are omitted. Also, because $C^{d_i}$ is 1 when $d_i = 0$, calculations are often skipped so as to speed up the process. In such a case, the multiplication of C is sometimes performed, sometimes unperformed by $d_i = 0/1$. The side channel attack targeting the RSA takes advantage of this characteristic. For example, performing multiplication causes a multiplier to operate so as to increases the power consumption, but when a multiplier does not operate, the total power consumption remains low. This makes it possible to measure 0/1 of key d by measuring the power consumption. This is referred to as the SPA (Simple Power Analysis) attack. There are other methods based on the SPA, including the DPA (Differential Power Analysis) attack, which statistically derives these characteristics from plural power consumption waveforms, an EM (Electro-Magnetic) attack, which measures electromagnetic wave noise, not power consumption, from a multiplier so as to use the measurement result for attacking, and others.

A generally employed countermeasure against the side channel attacks targeting the RSA is to add random number elements to values being calculated (intermediate values) and to exponents in order to derange the power consumption and noise so that the measurement by attackers cannot derive the key. In particular, it is known that adding random number elements to exponents makes it difficult to identify keys.

A fundamental format for a counter measurement of adding random number elements to exponents is a method referred to as Exponent Splitting disclosed by Non Patent Document 1 below. This method divides key d into two terms as represented by expression (4) below by using private key d and random number r, and calculates the expression (5) so as to make it difficult to analyze private key d.

$$d=d'+r \quad (4)$$

$$M=C^{d'}*C^r \bmod N \quad (5)$$

Also, in non Patent Document 5 (referred to as Ciet-Joye, hereinafter), the above expressions are modified so as to introduce a divisional expression, as below.

$$d=d_0*r+d_1 \quad (6)$$

A method of making it difficult to analyze private key d by using random numbers by calculating expression (7) below is proposed.

$$M=(C^r)^{d0}*C^{d1} \bmod N \quad (7)$$

Further, Ciet-Joye also proposes the used of a method referred to as Shamir's Trick, disclosed by non Patent Document 6, in which the products of plural modular-exponentiation operations are calculated at a high speed (hereinafter, referred to as Ciet-Joye+ST).

Shamir's Trick is a method by which, for example, very large integers such as $$z=x^a*y^b \quad (8)$$

can be calculated efficiently.

When a generally employed Binary method is used, $x^a$ and $y^b$ have to be calculated separately, and thus this method requires twice as much calculation as $x^a$, as shown in expression (9) below.

$$x^a=((\ldots((x^{an-1})^2*x^{an-2})^2*\ldots)^2*x^{a1})^2*x^{a0} \, y^b=((\ldots(y^{bn-1})^2*y^{bn-2})^2*\ldots)^2*y^{b1})^2*y^{b0}z=x^a*y^b \quad (9)$$

By contrast, Shamir's Trick results in table (10) below of four elements predetermined by ai and bi.

$$T[ai,bi]=\{1,x,y,xy\} \quad (10)$$

And expression (11) below is calculated.

$$z=((\ldots((T[a_{n-1},b_{n-1}])^2*T[a_{n-2},b_{n-2}])^2*\ldots)^2*T[a_1,b_1])^2*T[a_0,b_0] \quad (11)$$

This makes it possible to calculate z using almost the same amount of calculation as for $x^a$.

When RSA is implemented on a smartcard or the like, mounting that is as compact and fast as possible is required because the circuit area is limited, and operating frequencies are low. Further, a smartcard is a device having a chip mounted directly on the card itself, making it very vulnerable to attacks, and thus countermeasures against side channel attacks are essential.

FIG. 1 is an exemplary configuration of a circuit that performs a modular-exponentiation operation as decryption as expressed in expression (3) above. The operational circuit for the decryption also has the same configuration (see expressions (1) and (2)).

A modular-multiplication operation circuit 104 is a circuit for performing modular-multiplication operations one time. The performance cycle of the modular-multiplication operation circuit 104 is made of two cycles, the first operation cycle and the second operation cycle. Table 1 below depicts the control via a second switch 107 in each operation cycle.

TABLE 1

SWITCH CONTROL OF KEY PORTION IN FIG. 1

CONTROL OF SECOND SWITCH 107

| di VALUE | FIRST OPERATION CYCLE | SECOND OPERATION CYCLE |
|---|---|---|
| 0 | INTERMEDIATE VALUE | 1(SKIP) |
| 1 | INTERMEDIATE VALUE | C |

The second switch 107 selects and outputs an intermediate value 108 held in an in-operation data register 103. A second switch 107, in the second operation cycle, outputs value 1, for skipping operations, if the value of key bit $d_i$ corresponding to the current operation cycle held in a key register 105 is 0, and outputs multiplier factor C if the value of key bit $d_i$ is 1.

In the modular-exponentiation operation circuit illustrated in FIG. 1, first, an input register 101 is a register for inputting the innermost term "$C^{dn-1}$" in expression (3). This value is "C" if the most significant bit value of the key "$d_{n-1}$" is 1, and is "1" if that most significant bit value is zero.

The value in the input register 101 is held by the in-operation data register 103 through the input register 101 when the decryption operation starts. A first switch 102 selects and outputs the output of the input register 101 only when an operation has started, and thereafter, selects and outputs the output of the modular-multiplication operation circuit 104.

Then, in the first operation cycle, which starts immediately after the start of the operation, the second switch 107 selects and outputs the intermediate value 108, and thereby the modular-multiplication operation circuit 104 performs a squaring of "$(C^{dn-1})^2$" in expression (3) and the remainder operation for that.

In the subsequent second operation cycle, the second switch 107 outputs "1" or "C" in accordance with the value of key bit $d_{n-2}$, i.e., outputs the value of "$C^{dn-2}$", and thereby, the modular-multiplication operation circuit 104 performs the multiplication of "$(C^{dn-1})^2*C^{dn-2}$", in expression (3) and the remainder operation for that. When the second switch 107 has the output "1", the modular-multiplication operation circuit 104 does not have to perform multiplication, and the modular-multiplication operation circuit 104 is configured to output the input value as it is.

In the subsequent first operation cycle, the second switch 107 again selects and outputs the intermediate value 108 so that the modular-multiplication operation circuit 104 again performs squaring and multiplication for that. In the second operation cycle, the second switch 107 outputs "1" or "C" in accordance with the value of key bit $d_i$, i.e., outputs the value of "$C^{di}$" so that the modular-multiplication operation circuit 104 performs the multiplication of "$(C^{dn-1})^2*C^{dn-2}$" in expression (3) and the remainder operation for that.

The above pair of operations of the first and the second operation cycles is repeatedly performed (n−1) times so that expression (3) is calculated.

The above modular-exponentiation operation circuit allows the prediction of the key bit by the power analysis attacks or the like because the modular-multiplication operation circuit 104 operates or does not operate in accordance with the value of key bit $d_i$.

Thus, as prior art 1 to the present invention, an RSA that has introduced Exponent Splitting is considered. In the Exponent Splitting in the above expression (5), an adder is used for adding random number elements to d. As RSA operation resources can also be used for this, the circuit scale hardly increases. The RSA operations themselves use the normal RSA circuit in FIG. 1 only twice, and the circuit scale does not increase. Thus, it can be considered that Exponent Splitting hardly increases the circuit scale. However, the RSA circuit has to be used twice, and the RSA processing time period is twice as long as cases in which no countermeasures are taken. The reduction of the processing time period is a problem.

Next, as prior art technique 2 to the present invention, there is a case where a Ciet-Joye method is implemented. In this method, random number elements d0 and d1 used in expression (7) are operated from expression (6), and accordingly, a divider circuit is required for dividing key d by random number r. A dividing circuit is very large in circuit scale. In prior art 2, modular-exponentiation operations have to be performed for three types, i.e., $C^r$, $(C^r)^{d0}$, $C^{d1}$, and the total number of bits of r and d0 is almost the same as that of the original d, and thus the processing time is approximately 1.5 times longer than a case where countermeasures are not take (FIG. 1). That is, a dividing circuit increases in circuit scale and the processing time becomes 1.5 times longer, and thus, implementation of Ciet-Joye causes a problem of reduction both in the circuit scale and the processing time period.

Further, as prior art 3 to the present invention, there is a case of expression (11) of applying ST to Ciet-Joye. FIG. 2 illustrates an exemplary configuration of a modular-exponentiation circuit that has to correspond to prior art 3. Table 2 below depicts control rules of the second switch 107 illustrated in FIG. 2.

TABLE 2

SWITCH CONTROL OF KEY PORTION IN FIG. 2

| d0i VALUE | d1i VALUE | FIRST OPERATION CYCLE | SECOND OPERATION CYCLE |
|---|---|---|---|
| 0 | 0 | INTERMEDIATE VALUE | 1 (SKIP) |
| 0 | 1 | INTERMEDIATE VALUE | $C^r$ |
| 1 | 0 | INTERMEDIATE VALUE | $C$ |
| 1 | 1 | INTERMEDIATE VALUE | $C^{r+1}$ |

In FIG. 2, portions denoted by the same numerical symbols as in FIG. 1 have the same functions as in FIG. 1.

In FIG. 2, a division circuit 202 stores, in a quotient register 203 and a remainder register 204, quotient d0 and remainder d1 obtained respectively by dividing key d stored in the key register 105 by random number r stored in a random number register 201.

In prior art 3, on the basis of the relationship between expression (7) and (8), $a_i$ and $b_i$ in expression (10) correspond to $d0_i$, and $d1_i$, and x, y, and xy in expression (10) correspond to $C^r$, C, and $C^r*C=C^{r+1}$. As a result of this, in prior art 3, the table values below expressed by expression (10)

$$T[d0_i, d1_i] = \{1, C^r, C, C^{r+1}\} \quad (12)$$

are calculated when the operation starts, and are held in a multiplier-factor table memory 205 illustrated in FIG. 2.

On the basis of the above relationship, the operation of expression (7) expressed by expression (11) can be realized by repeating squaring and multiplication similarly to the case of expression (3). Accordingly, similarly to the case of FIG. 1, the second switch 107 in the circuit in FIG. 2 selects and outputs the intermediate value 108 held in the in-operation data register 103 in the first operation cycle so as to make the modular-multiplication operation circuit 104 perform squaring, and selects and outputs the value in the multiplier-factor table memory 205 based on expression (12) or table 2 in accordance with the combination of the value of quotient bit value $d0_i$ held in the quotient register 203 and the remainder bit value $d1_i$ of the key held in the remainder register 204 so as to make the modular-multiplication operation circuit 104 perform multiplication.

In prior art 3, each value in $\{C, C^r C^{r+1}\}$ has to be calculated and set in the multiplier-factor table memory 205. This logic is complicated; however, once each value has been set, the processing time period can be reduced almost as much as in the case were there are no countermeasures in FIG. 1. That is, the switching mechanism of the multiplier-factor table memory 205 increases in addition to the addition of the division circuit 202 in view of circuit scale, and the processing time becomes almost the same as in the case where there are no countermeasures. Accordingly, when Ciet-Joye+ST is implemented, the reduction in circuit scale is a problem.

Security provided by the methods of prior arts 1 through 3 is sufficiently high (said to be a security of approximately 160 bits) as to be implemented on software (firmware) of the RSA. Conversely, security by these methods is too high to implement the RSA in a hardware manner, and thus it is desirable to realize smaller and faster implementation even at a cost of a slight drop in security.

As a countermeasure against this, a case where ST is simply applied to prior art 1 is considered. In this method, the RSA operation portion in expression (5) in prior art 1 is performed by a switching of tables. In other words, FIG. 3 illustrates an exemplary configuration of a modular-exponentiation corresponding to conventional technique 1+ST method, and Table 3 below is a table illustrating the rules of controlling the second switch 107 in FIG. 3.

TABLE 3

SWITCH CONTROL OF KEY PORTION IN FIG. 3

| d'i VALUE | ri VALUE | CONTROL OF SECOND SWITCH 107 | |
|---|---|---|---|
| | | FIRST OPERATION CYCLE | SECOND OPERATION CYCLE |
| 0 | 0 | INTERMEDIATE VALUE | 1 (SKIP) |
| 0 | 1 | INTERMEDIATE VALUE | C |
| 1 | 0 | INTERMEDIATE VALUE | C |
| 1 | 1 | INTERMEDIATE VALUE | $C^2$ |

In FIG. 3, portions denoted by the same numerical symbols as in FIG. 1 have the same functions as in FIG. 1.

In FIG. 3, a subtractor circuit 301 obtains key d' by subtracting random number r held in random number register 201 from key d held in the key register 105 on the basis of expression (4), and stores obtained key d' in a key register 302.

Also, according to the 1+ST method, which is a conventional technique, on the basis of expressions (5) and (8), $a_i$ and $b_i$ in expression (10) correspond to d' and r. x, y and xy in expression (10) correspond to C, C, and C*C=$C^2$. As a result of this, in conventional technique 3, the respective values that correspond to the table values expressed by expression (10), i.e., the following expression (13):

$$T[d',r] = \{1, C, C, C^2\} \tag{13}$$

are calculated when the operation starts, and the results are stored in the multiplier-factor table memory 205 in FIG. 3. The second and third terms are both "C", and accordingly the value that is actually operated is a single value, i.e., "$C^2$", and values to be stored are two values, i.e., "C" and "$C^2$".

On the basis of the above, the operation of expression (5) expressed by expression (11) is realized by repeating squaring and multiplication similarly to the case of expression (3). Accordingly, similarly to the case of FIG. 1, the second switch 107 in the circuit in FIG. 3 selects and outputs the intermediate value 108 held in the in-operation data register 103, and thereby makes the modular-multiplication operation circuit 104 perform squaring, and in the second operation cycle, the second switch 107 selects and outputs a value in the multiplier-factor table memory 205 on the basis of expression (13) or table 3 in accordance with the combination of key bit value $d'_i$ held in the key register 302 and random number bit value $r_i$ held in the random number register 201.

The 1+ST method, which is a conventional technique, holds only $\{C, C^2\}$ on the multiplier-factor table memory 205, and a simple logic can be used for setting values on a table. The processing speed can be as high as in the case where no countermeasures are taken against attack. However, in this method, many of the random number elements added by Exponent Splitting are cancelled by ST, and only 1 bit each of a randomness property is effective for the exponential portion and intermediate value portion. Accordingly, the 1+ST method involves a problem wherein it does not have effective countermeasures against attack.

Below is a list of prior art examples referred to in the above background art.

Non Patent Document 1:
Paul Kocher, Joshua Jaffe, and Benjamin Jun, "Differential Power Analysis," in proceedings of Advances in Cryptology-CRYPTO'99, Lecture Notes in Computer Science vol. 1666, Springer-Verlag, 1999, pp. 388-397

Non Patent Document 2:
Thomas S. Messerges, Ezzy A. Dabbish and Robert H. Sloan, "Power Analysis Attacks of Modular Exponentiation in Smartcards", Cryptographic Hardware and Embedded Systems (CHES'99), Lecture Notes in Computer Science vol. 1717, Springer-Verlag, pp. 144-157

Non Patent Document 3:
Jean-Sebastien Coron "Resistance against Differential Power Analysis for Elliptic Curve Cryptosystems", Cryptographic Hardware and Embedded Systems (CHES'99), Lecture Notes in Computer Science vol. 1717, Springer-Verlag, pp. 292-302, 1999

Non Patent Document 4:
C. Clavier and M. Joye, "Universal Exponentiation Algorithm: A First Step towards Provable SPA-Resistance", CHES'01, LNCS 2162, Springer-Verlag, 2001, 300-308, 2001

Non Patent Document 5:
M. Ciet and M. Joye "(Virtually) Free randomization techniques for elliptic curve cryptography," Information and Communications Security (ICICS 2003), LNCS2836, pp. 348-359, Springer-Verlag, 2003.

Non Patent Document 6:
El Gamal, T.: A public key cryptosystem and a signature scheme based on discrete logarithms. IEEE Transactions on Information Theory 31 (1985) 469-472

SUMMARY

The present invention relates to a technique of preventing a private key from being guessed via a power analysis attack (electromagnetic-wave analysis attack) in cryptography hardware for performing RSA cryptography, and by applying the techniques of the present invention, it can efficiently be made difficult for the power analysis attack (electromagnetic-wave analysis attack) to guess a private key, and a cryptographic processor with high tamper proofing can be achieved.

The present invention is based on a cryptographic processing method, program, device, and an embedded device including a device for performing encryption or decryption by performing the modular-exponentiation operation, expressed by the following expression, by repeating modular-multiplication operation steps of performing multiplication and a remainder operation with respect to the first and second inputs, where C represents input data, d represents key data, M represents output data, and mod N represents a remainder operation by modulus N.

$$M = C^d \bmod N$$

The first aspect of the present invention employs the configuration as below.

First, random number data and key data d are input, and a step is executed in which random number data r is subtracted from key data d so as to calculate key data d'.

Next, when an operation starts, a step is executed in which $-C$ and $-C^2$ are operated with respect to input data C, and C, $-C$, and $-C^2$ are stored.

Then, operations are sequentially repeated starting from significant bits corresponding to respective bit values $d_i$ ($0 \le i \le n-1$) that constitute key data d. In the first operation cycle, the modular-multiplication operation step is executed using the result of the previously repeated operations as the first and second inputs. In the second operation cycle, one of the stored values C, $-C$, and $-C^2$ is read selectively in accordance with the combination of bit value $d'_i$ corresponding to bit value $d_i$ that constitutes key data d' and bit value $r_i$ corresponding to bit value $r_i$ that constitutes random number data r, so as to handle the read value as the second input, and a modular-multiplication operation step is executed using the result of the previously repeated operations as the first input or the modular-multiplication operation step is skipped so as to execute a repeated operation step for obtaining the result of the currently repeated operations.

In the second operation cycle in a repeated operation step, when bit value $d'_i=0$ and bit value $r_i=0$, the modular-multiplication operation step is skipped, when bit value $d'_i=0$ and bit value $r_i=1$, a modular-multiplication operation step is executed by reading the value of stored value $-C$ as the second input and using the result of the previously repeated operations as the first input, when bit value $d'_i=1$ and bit value $r_i=0$, the value of stored value C is read as the second input and a modular-multiplication operation step is executed using the result of the previously repeated operation and is used as the first input, and when bit value $d'_i=1$ and bit value $r_i=1$, the value of stored $-C^2$ is read as the second input and a modular-multiplication operation step is executed using the result of the previously repeated operations as the first input.

The second aspect of the present invention has a configuration as described below.

First, when an operation starts, a step is executed in which $-C$ and $-C$ are operated with respect to input data C, and $-1$, C, and $-C$ are stored.

Next, operations are sequentially repeated starting from significant bits corresponding to respective bit values $d_i$ ($0 \leq i \leq n-1$) that constitute key data d. In the first operation cycle, the modular-multiplication operation step is executed using the result of the previously repeated operations as the first and second inputs. In the second operation cycle, one of stored values $-1$, C, and $-C$ is read selectively in accordance with the combination of bit value $d_i$ and bit value $r_i$ corresponding to bit value $d_i$ that constitutes random number data r so as to handle the read value as the second input, and a modular-multiplication operation step is executed using the result of the previously repeated operations as the first input or the modular-multiplication operation step is skipped so as to execute a repeated operation step for obtaining the result of the currently repeated operations.

In the second operation cycle in a repeated operation step, when bit value $d'_i=0$ and bit value $r_i=0$, the modular-multiplication operation step is skipped, when bit value $d'_i=0$ and bit value $r_i=1$, a modular-multiplication operation step is executed by reading the value of stored value $-1$ as the second input and using the result of the previously repeated operations as the first input, when bit value $d'_i=1$ and bit value $r_i=1$, the value of stored value $-C$ is read as the second input and a modular-multiplication operation step is executed using the result of the previously repeated operation and is used as the first input, and when bit value $d'_i=1$ and bit value $r_i=1$, the value of stored value $-C$ is read as the second input and a modular-multiplication operation step is executed using the result of the previously repeated operations as the first input.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
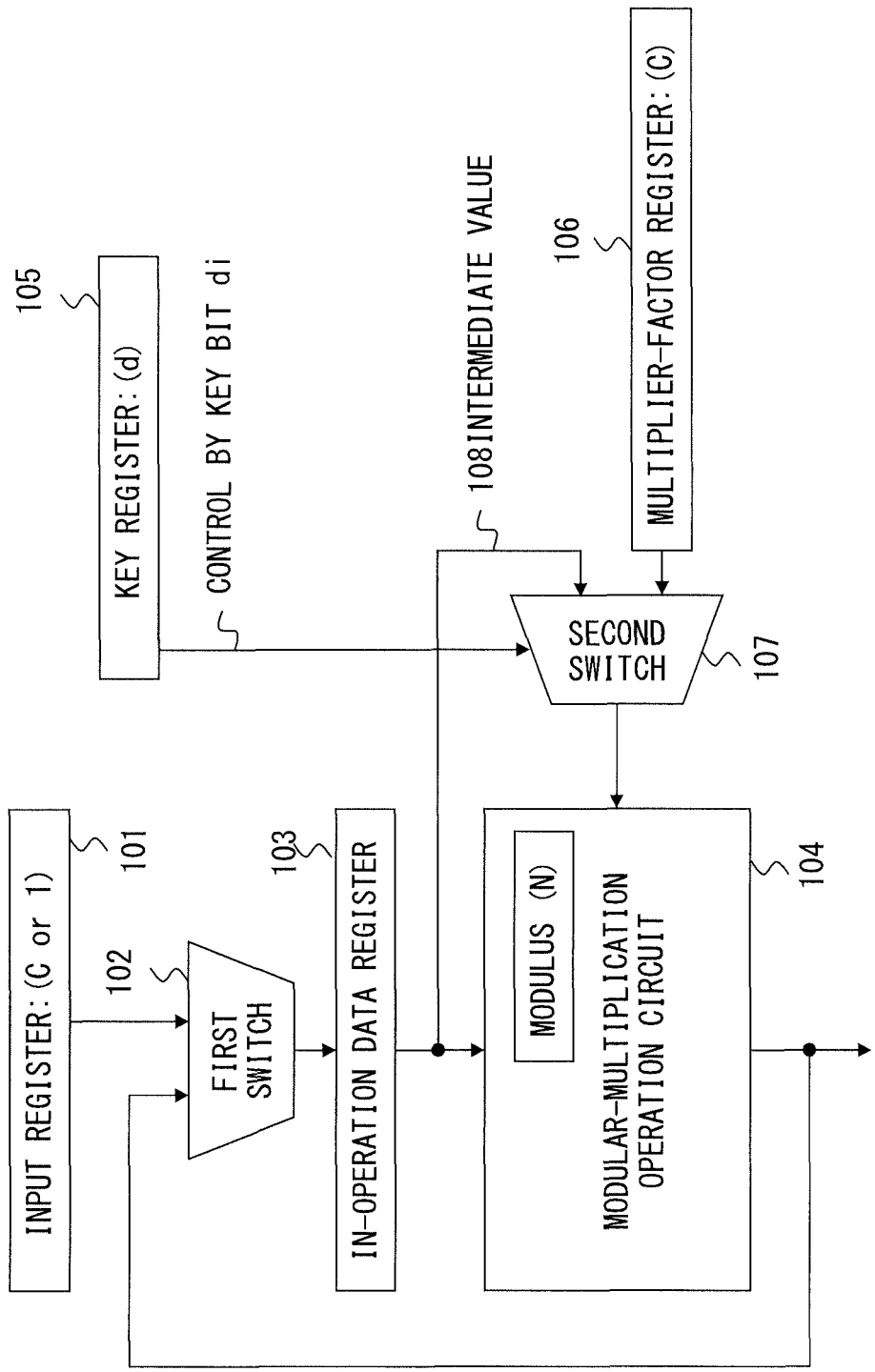
FIG. 1 illustrates a general configuration example of a modular-exponentiation circuit.
Figure 2:
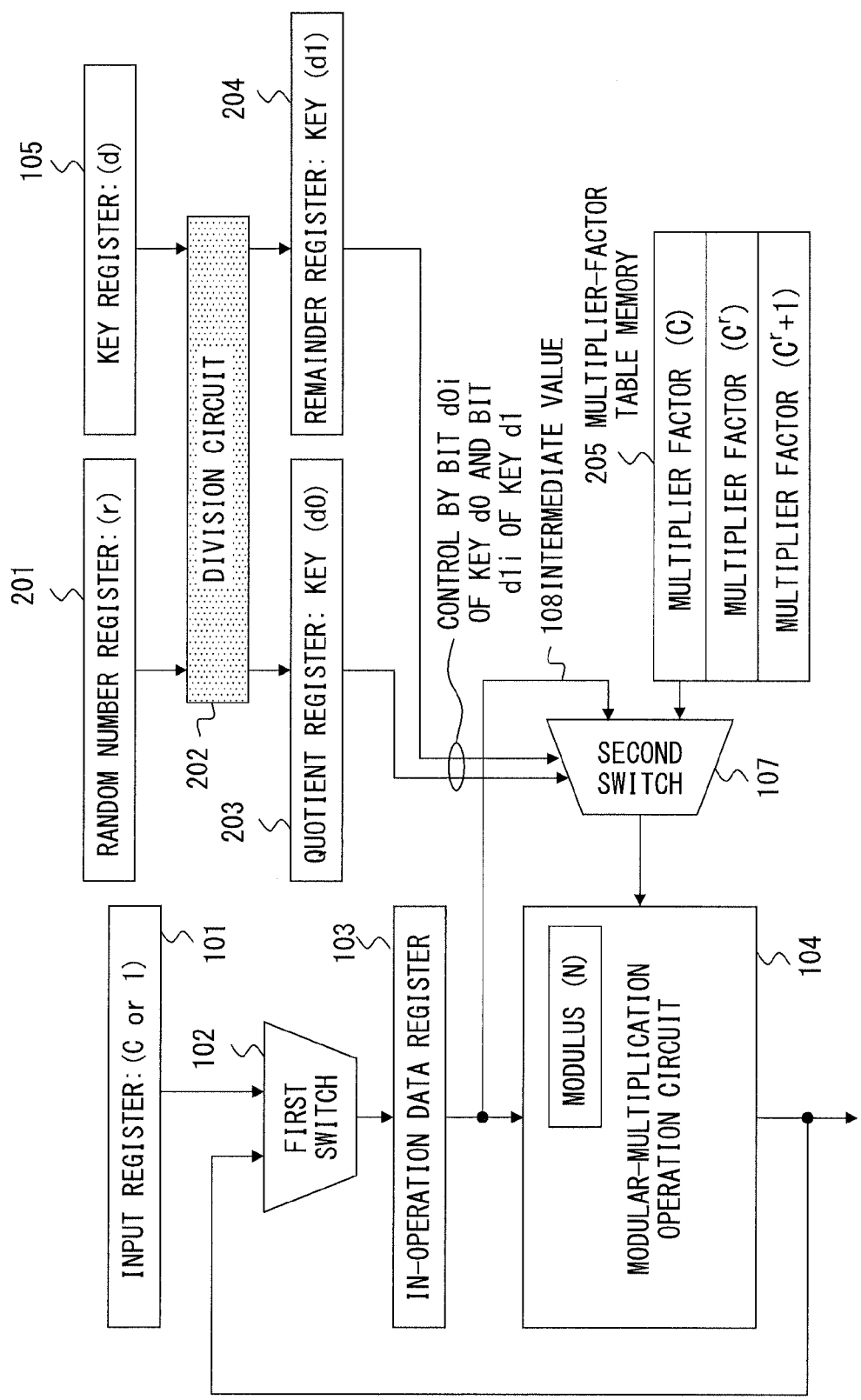
FIG. 2 illustrates an exemplary configuration of conventional technique 2 (Ciet-Joye+ST)
Figure 3:
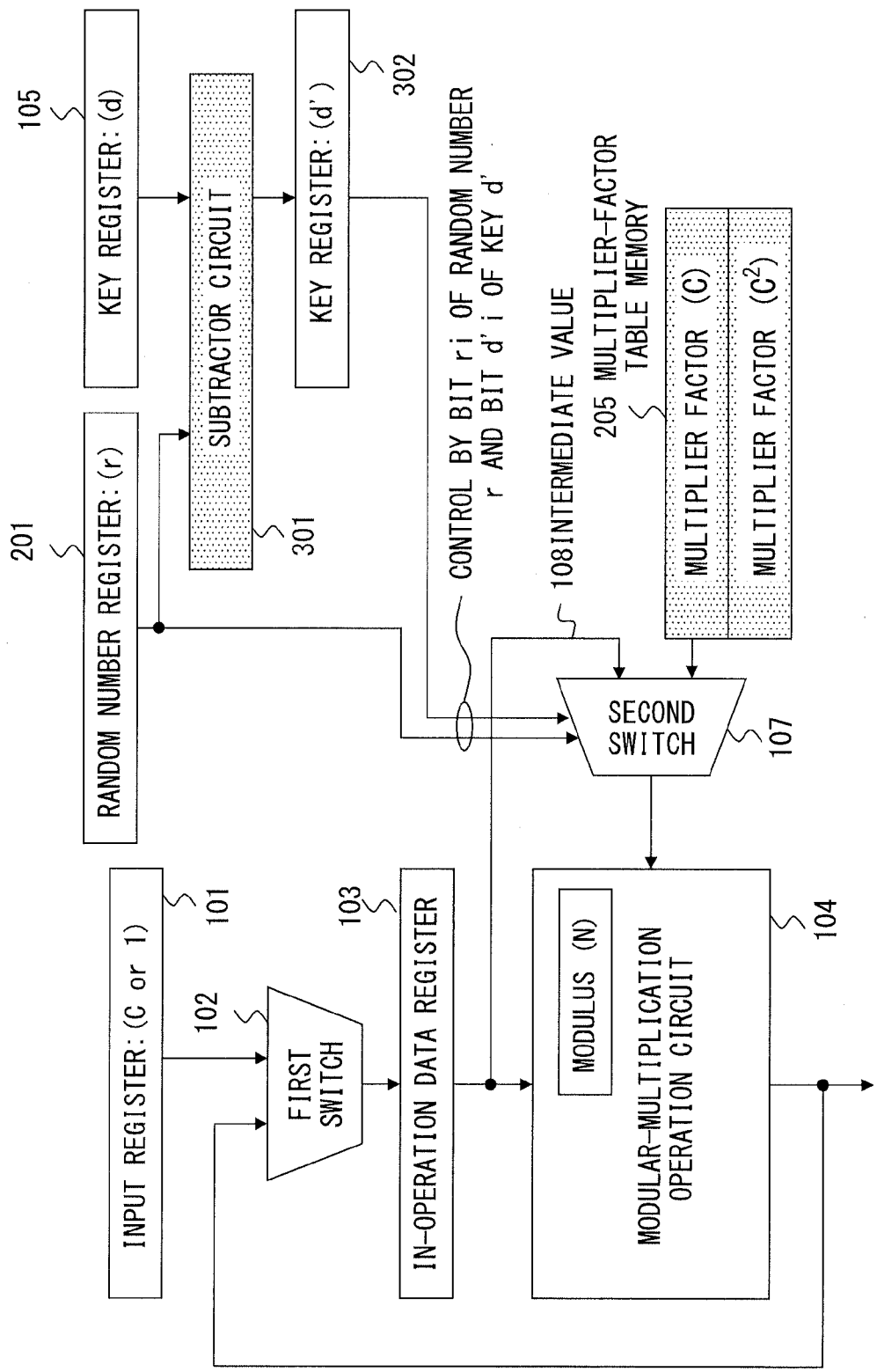
FIG. 3 illustrates an exemplary configuration of the Exponent Splitting+ST method.

Hereinafter, preferred embodiments for implementing the present invention will be explained in detail by referring to the drawings.

First Embodiment of the Present Invention

One of reasons for the low security of the conventional 1+ST method described in the background art section is that $x=y=C$ can be derived by simply applying expression (5) to expression (8) of ST. The value stored in the multiplier-factor table memory 205 becomes two values that do not include the random number $\{C, C^2\}$, limiting the range of possible values.

In order to cope with this, expressions of Exponent Splitting are modified as below by using a negative value so that $x!=y$ is satisfied where "!=" represents the negation of "=".

$$d=d'+2r \quad (14)$$

$$M=C^{d'}*(-C)^{2r} \bmod N \quad (15)$$

Figure 4:
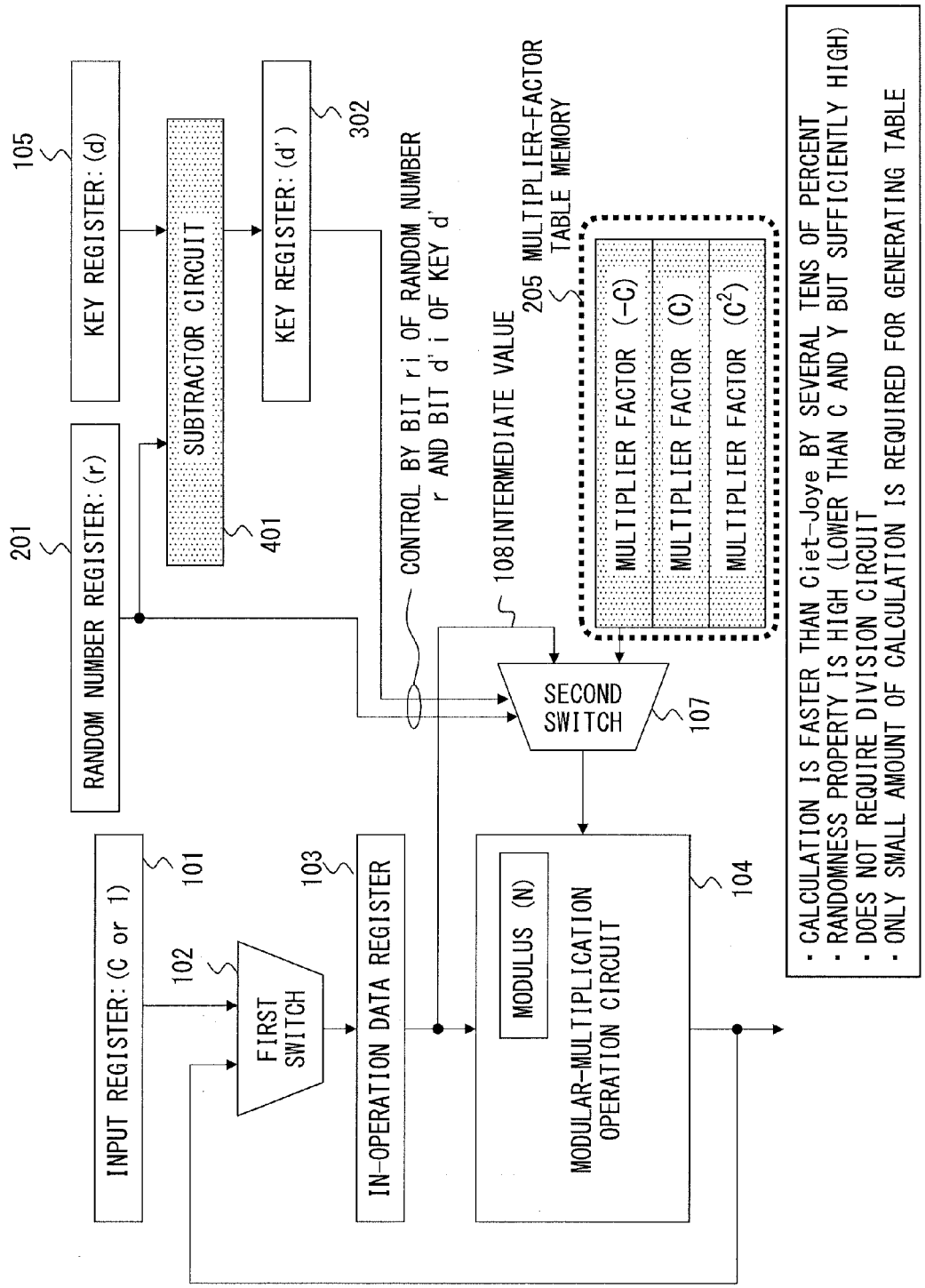
FIG. 4 illustrates an exemplary configuration of a first embodiment.

In the first embodiment, from the relationship between expressions (15) and (8), $a_i$ and $b_i$ correspond to d' and 2r, and x, y, and xy in expression (10) correspond C, $-C$, and $C*(-C)=-C^2$. As a result of this, in the first embodiment, respective values corresponding to the table values, expressed as $$T[d',2r]=\{1,C,-C,-C^2\} \quad (16)$$

are calculated when the operation starts, and the results are held in the multiplier-factor table memory 205 illustrated in FIG. 4. Thereby, three values of $\{C, -C, -C^2\}$ are held by the multiplier-factor table memory 205, and the randomness property increases to 2 bits each for the exponential portion and the intermediate value portion. The processing time period, the circuit scale, and the logic for generating tables are equal to those in the (Exponent Splitting)+ST method in prior art 1.

This configuration is also characteristic in that the use of even numbers for random numbers automatically cancels negative values of $-C$ to be used as ST, eliminating the need for the modification.

FIG. 4 illustrates an exemplary configuration of a modular-exponentiation operation circuit corresponding to the first embodiment, and table 4 below illustrates the rules for controlling the second switch 107 in FIG. 4.

TABLE 4

SWITCH CONTROL OF KEY PORTION IN FIG. 4

| | | CONTROL OF SECOND SWITCH 107 | |
|---|---|---|---|
| d'i VALUE | ri VALUE | FIRST OPERATION CYCLE | SECOND OPERATION CYCLE |
| 0 | 0 | INTERMEDIATE VALUE | 1 (SKIP) |
| 0 | 1 | INTERMEDIATE VALUE | $-C$ |
| 1 | 0 | INTERMEDIATE VALUE | C |
| 1 | 1 | INTERMEDIATE VALUE | $-C^2$ |

In FIG. 4, portions denoted by the same numerical symbols as in FIG. 1 have the same functions as those in FIG. 1.

In FIG. 4, a subtractor circuit 401 obtains key d' by subtracting random number 2r held in random number register 201 from key d held in the key register 105 on the basis of expression (14), and stores obtained key d' in a key register 302.

When an operation starts, values "−C" and "−C²" in expression (16) are calculated, and the results are held in the multiplier-factor table memory 205 together with value "C".

On the basis of the above relationship, the operation of expression (15) expressed by expression (11) can be implemented by repeating squaring and multiplication, similarly to the case of expression (3). Accordingly, similarly to the case of FIG. 1, in the circuit in FIG. 4, the second switch 107 selects and outputs the intermediate value 108 held in the in-operation data register 103 in the first operation cycle, and thereby makes the modular-multiplication operation circuit 104 perform squaring, and selects and outputs, on the basis of expression (16) or table 4, the value of the multiplier-factor table memory 205 in accordance with the combination of key bit value $d'_i$ held in the key register 302 and random number bit value $r_i$ held in the random number register 201 so as to make the modular-multiplication operation circuit 104 perform multiplication.

As described above, according to the first embodiment, it is possible to make the processing time period shorter than that in prior art 1, to make the circuit scale smaller than that in prior art 2, and to make security higher than that in the Exponent Splitting+ST method.

Second Embodiment of the Present Invention

As explained in the first embodiment above, the use of the ST method that uses negative values makes it possible to make security higher than that in the Exponent Splitting+ST method, and to reduce the operation time period, resources, and the circuit scale resources.

In the first embodiment, C and −C were used for x and y in the ST method. If they are C and −1, the circuit can be simplified. In this configuration, d is used without being subject to Exponent Splitting.

$$M = C^{d'} * (-1)^{2r} \bmod N \quad (17)$$

In the second embodiment, from the relationship between expressions (17) and (8), $a_i$ and $b_i$ correspond to d' and 2r, and x, y, and xy in expression (10) correspond C, −1, and C*(−1)=−C. As a result of this, in the second embodiment, respective values corresponding to the table values expressed in expression (10), $$T[d', 2r] = \{1, C, -1, -C\} \quad (18)$$

are calculated respectively when the operation starts, and the resultant values are held in the multiplier-factor table memory 205 in FIG. 4. Thereby, the three values {C, −1, −C} are held by the multiplier-factor table memory 205, and the randomness property increases to 2 bits each for the exponential portion and the intermediate value portion. The processing time period, the circuit scale, and the logic for generating tables are equal to those in the (Exponent Splitting)+ST method in prior art 1.

This configuration is also characteristic in that the use of even numbers as random numbers automatically cancels negative values of −C to be used as ST, eliminating the need for modification.

Figure 5:
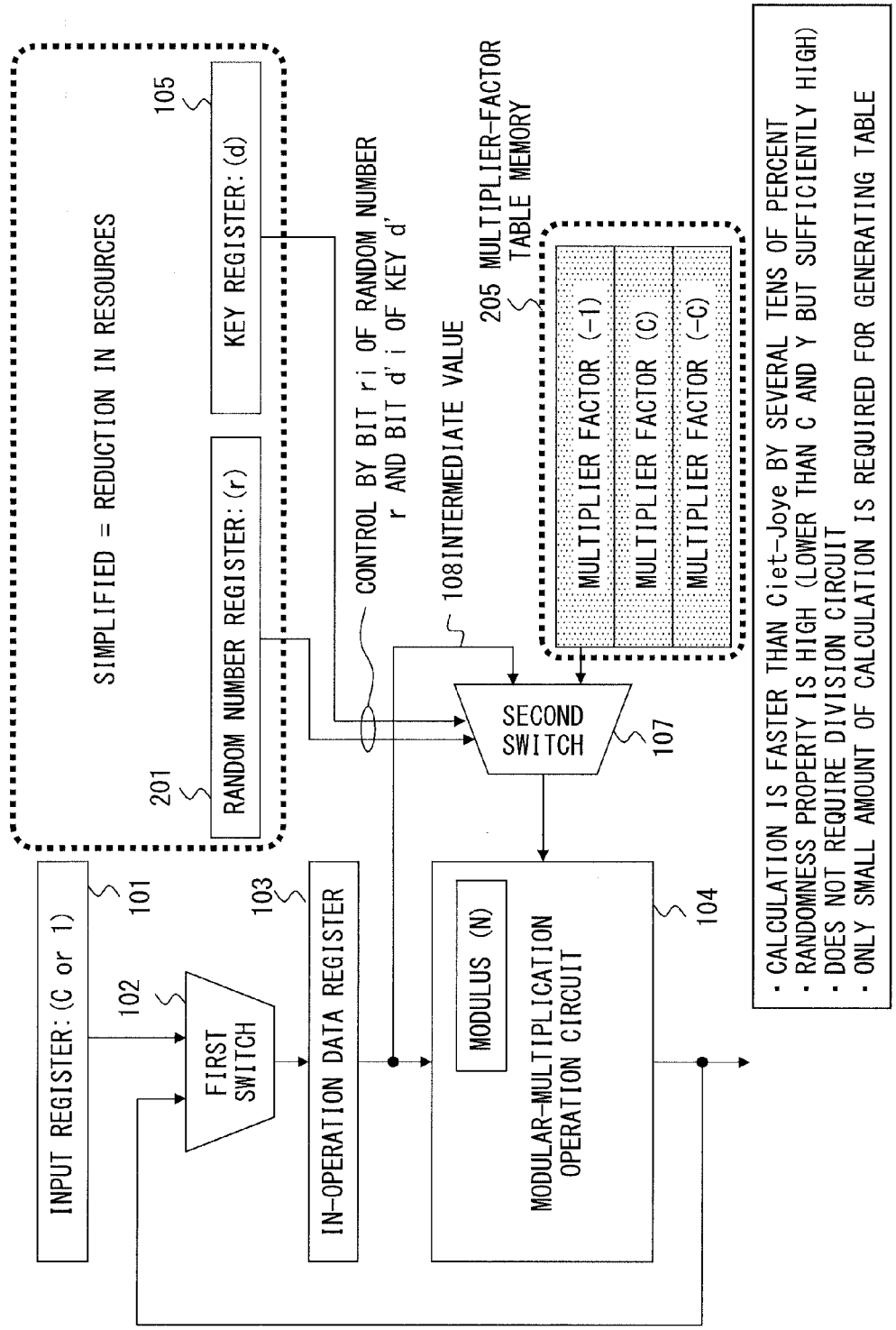
FIG. 5 illustrates an exemplary configuration of a second embodiment.

FIG. 5 illustrates an exemplary configuration of a modular-exponentiation operation circuit corresponding to the second embodiment, and table 5 below illustrates the rules for controlling the second switch 107 in FIG. 5.

TABLE 5

SWITCH CONTROL OF KEY PORTION IN FIG. 5

| | | CONTROL OF SECOND SWITCH 107 | |
|---|---|---|---|
| $d'_i$ VALUE | $r_i$ VALUE | FIRST OPERATION CYCLE | SECOND OPERATION CYCLE |
| 0 | 0 | INTERMEDIATE VALUE | 1 (SKIP) |
| 0 | 1 | INTERMEDIATE VALUE | −1 |
| 1 | 0 | INTERMEDIATE VALUE | C |
| 1 | 1 | INTERMEDIATE VALUE | −C |

In FIG. 5, portions denoted by the same numerical symbols as in FIG. 1 have the same functions as in FIG. 1.

In FIG. 5, the subtractor circuit 401, which is required in FIG. 4, is not necessary.

When the operation starts, only the value "−C" in expression (18) is calculated, and the resultant value is held in the multiplier-factor table memory 205 together with the values "C" and "−1".

On the basis of the above relationship, the operations of expression (17) expressed by expression (11) can be realized by repeating squaring and multiplication similarly to the case of expression (3). Accordingly, similarly to the case of FIG. 1, in the circuit in FIG. 5, the second switch 107 selects and outputs the intermediate value 108 held in the in-operation data register 103 in the first operation cycle, and thereby makes the modular-multiplication operation circuit 104 perform squaring, and selects and outputs, on the basis of expression (18) or table 5, the value of the multiplier-factor table memory 205 in accordance with the combination of key bit value $d_i$ held in the key register 105 and random number bit value $r_i$ held in the random number register 201 so as to make the modular-multiplication operation circuit 104 perform multiplication.

As described above, according to the second embodiment, it is possible to make the processing time period shorter than that in prior art 1, to make the circuit scale smaller than that in prior art 2, and to make security higher than that in the Exponent Splitting+ST method. However, the only value that can be an input value from the multiplier-factor table memory 205 is C or −C (−1 is cancelled in the operations between the intermediate values in the first operation cycle following the second operation cycle), and accordingly, the randomness property of intermediate values is equal to those in the Exponent Splitting+ST method.

Supplement to First and Second Embodiments of the Present Invention

Table 6 below illustrates results of comparing the respective methods.

TABLE 6

COMPARISON BETWEEN RESPECTIVE METHODS

| | RONDOMNESS PROPERTY OF EXPONENT | RONDOMNESS PROPERTY OF INTERMEDIATE VALUE | PROCESSING TIME PERIOD | RESOURCE ADDITION | TABLE GENERATION CONTROL |
|---|---|---|---|---|---|
| NO COUNTERMEASURE | 0 | 0 | | NO | SIMPLE |
| Exponent Splitting | VERY HIGH | VERY HIGH | 200 | SUBTRACTOR CIRCUIT (SHARING RESOURCES) | SIMPLE |
| Ciet-Joye | VERY HIGH | VERY HIGH | 150 | DIVIDING CIRCUIT | COMPLICATED |
| Ciet-Joye +ST | VERY HIGH | VERY HIGH | 100 | DIVIDING CIRCUIT 3 TABLES | COMPLICATED |
| Exponent Splitting +ST | 1 bit | 1 bit | 100 | SUBTRACTOR CIRCUIT 2 TABLES | SIMPLE |
| FIRST EMBODIMENT | 2 bit | 2 bit | 100 | SUBTRACTOR CIRCUIT 3 TABLES | SIMPLE |
| SECOND EMBODIMENT | 2 bit | 1 bit | 100 | 2 TABLES | SIMPLE |

This table illustrates that the first and second embodiments are equal to the Exponent Splitting+ST method in circuit scale, processing time period, and table generation logic, and have a higher randomness property (i.e., security).

It is obvious from the equality between expressions (1) and (2) that a modular-exponentiation operation circuit implemented as the first or the second embodiment can be applied to both an encryption device and a decryption device.

The embodiments according to the present invention can be implemented as an embedded device such as a smart card or as an on-board device provided with a tamper proofing technique for RSA cryptography.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A cryptographic processing method that repeatedly executes a modular-multiplication operation in which multiplication and a remainder operation are performed with respect to a first input and a second input so as to perform a modular-exponentiation operation that is expressed by:

$$M = C^d \bmod N$$

where C represents an input value, d represents key data, M represents output data, and mod N represents a remainder operation based on modulus N so as to perform encryption and decryption, the method comprising:

inputting random number data and the key data d, and of calculating key data d' by subtracting the random number data r from the key data d;

calculating values $-C$ and $-C^2$ with respect to the input data C, and of storing the values C, $-C$, and $-C^2$ when an operation starts; and executing the modular-multiplication operation using a result of a previously repeated operation as the first input and the second input in a first operation cycle which is sequentially and repeatedly executed starting from significant bits corresponding to respective bit values $d_i$ ($0 \leq i \leq n-1$) that constitute the key data d, selectively reading one of the stored values C, $-C$, and $-C^2$ in accordance with the combination of bit value $d'_i$ corresponding to the bit value $d_i$ that constitutes the key data d' and the bit value $r_i$ corresponding to the bit value $d_i$ that constitutes the random number data r so as to use the read value as the second input, and executing the modular-multiplication operation using the result of the previously repeated operation as the first input or by skipping the modular-multiplication operation so as to obtain the result of the currently repeated operation in a second operation cycle subsequent to the first operation cycle, wherein in the second operation cycle in the repeated modular-multiplication operation:

skipping the modular-multiplication operation when the bit value $d'_i=0$ and the bit value $r_i=0$ are satisfied;

reading a value of the stored value $-C$ to use the value as the second input, using a result of the previously repeated operation as the first input, and executing the modular-multiplication operation when the bit value $d'_i=0$ and the bit value $r_i=1$ are satisfied;

reading a value of the stored value C to use the value as the second input, using a result of the previously repeated operation as the first input, and executing the modular-multiplication operation when the bit value $d'_i=1$ and the bit value $r_i=0$ are satisfied; and reading a value of the stored value $-C^2$ to use the value as the second input, using a result of the previously repeated operation as the first input, and executing the modular-multiplication operation when the bit value $d'_i=1$ and the bit value $r_i=1$ are satisfied.

2. A non-transitory computer readable storage medium storing a program for a computer that repeatedly executes a modular-multiplication operation in which multiplication and a remainder operation are performed with respect to a first input and a second input so as to perform a modular-exponentiation operation that is expressed by:

$$M = C^d \mod N$$

where C represents an input value, d represents key data, M represents output data, and mod N represents a remainder operation based on modulus N so as to perform encryption and decryption, the program making the computer to execute a process comprising:
- inputting random number data and the key data d, and calculating key data d' by subtracting the random number data r from the key data d;
- calculating values $-C$ and $-C^2$ with respect to the input data C, and storing the values C, $-C$, and $-C^2$ when an operation starts; and
- executing the modular-multiplication operation using a result of a previously repeated operation as the first input and the second input in a first operation cycle which is sequentially and repeatedly executed starting from significant bits corresponding to respective bit values $d_i$ ($0 \leq i \leq n-1$) that constitute the key data d, selectively reading one of the stored values C, $-C$, and $-C^2$ in accordance with the combination of bit value $d'_i$ corresponding to the bit value $d_i$ that constitutes the key data d' and the bit value $r_i$ corresponding to the bit value $d_i$ that constitutes the random number data r so as to use the read value as the second input, and executing the modular-multiplication operation using the result of the previously repeated operation as the first input or skipping the modular-multiplication operation so as to obtain the result of the currently repeated operation in a second operation cycle subsequent to the first operation cycle,
- wherein in the second operation cycle in the repeated modular-multiplication operation:
- skipping the modular-multiplication operation when the bit value $d'_i=0$ and the bit value $r_i=0$ are satisfied;
- reading a value of the stored value $-C$ to use the value as the second input, using a result of the previously repeated operation as the first input, and executing the modular-multiplication operation when the bit value $d'_i=0$ and the bit value $r_i=1$ are satisfied;
- reading a value of the stored value C to use the value as the second input, using a result of the previously repeated operation as the first input, and executing the modular-multiplication operation when the bit value $d'_i=1$ and the bit value $r_i=0$ are satisfied; and
- reading a value of the stored value $-C^2$ to use the value as the second input, using a result of the previously repeated operation as the first input, and executing the modular-multiplication operation when the bit value $d'_i=1$ and the bit value $r_i=1$ are satisfied.

3. A cryptographic processing device that repeatedly executes a modular-multiplication operation unit in which multiplication and a remainder operation are performed with respect to a first input and a second input so as to perform a modular-exponentiation operation that is expressed by:

$$M = C^d \mod N$$

where C represents an input value, d represents key data, M represents output data, and mod N represents a remainder operation based on modulus N so as to perform encryption and decryption, the device comprising:
- a processor; and
- a memory, wherein the processor comprises,
    - a subtraction unit configured to input random number data and the key data d, and calculate key data d' by subtracting the random number data r from the key data d,
    - a storage unit configured to calculate values $-C$ and $-C^2$ with respect to the input data C, and store the values C, $-C$, and $-C^2$ to the memory when an operation starts, and
- a repeated operation unit configured to execute the modular-multiplication operation unit using a result of a previously repeated operation as the first input and the second input in a first operation cycle which is sequentially and repeatedly executed starting from significant bits corresponding to respective bit values $d_i$ ($0 \leq i \leq n-1$) that constitute the key data d, selectively reading one of the stored values C, $-C$, and $-C^2$ in accordance with the combination of bit value $d'_i$ corresponding to the bit value $d_i$ that constitutes the key data d' and the bit value $r_i$ corresponding to the bit value $d_i$ that constitutes the random number data r so as to use the read value as the second input, and execute the modular-multiplication operation unit using the result of the previously repeated operation as the first input or by skipping execution of the modular-multiplication operation unit so as to obtain the result of the currently repeated operation in a second operation cycle subsequent to the first operation cycle, wherein:
- in the second operation cycle, the repeated modular-multiplication operation unit:
- skips execution of the modular-multiplication operation unit when the bit value $d'_i=0$ and the bit value $r_i=0$ are satisfied;
- reads a value of the stored value $-C$ to use the value as the second input, uses a result of the previously repeated operation as the first input, and executes the modular-multiplication operation unit when the bit value $d'_i=0$ and the bit value $r_i=1$ are satisfied;
- reads a value of the stored value C to use the value as the second input, uses a result of the previously repeated operation as the first input, and executes the modular-multiplication operation unit when the bit value $d'_i=1$ and the bit value $r_i=0$ are satisfied; and
- reads a value of the stored value $-C^2$ to use the value as the second input, uses a result of the previously repeated operation as the first input, and executes the modular-multiplication operation when the bit value $d'_i=1$ and the bit value $r_i=1$ are satisfied.

* * * * *